(12) United States Patent
Nemoto et al.

(10) Patent No.: US 12,157,496 B2
(45) Date of Patent: Dec. 3, 2024

(54) CONTROL DEVICE AND CONTROL METHOD FOR VEHICLE

(71) Applicant: TOYOTA JIDOSHA KABUSHIKI KAISHA, Toyota (JP)

(72) Inventors: Kazuki Nemoto, Susono (JP); Shin Tanaka, Numazu (JP); Satoshi Nakamura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 17/473,182

(22) Filed: Sep. 13, 2021

(65) Prior Publication Data
US 2022/0185328 A1    Jun. 16, 2022

(30) Foreign Application Priority Data

Dec. 11, 2020    (JP) ................................. 2020-206202

(51) Int. Cl.
| | |
|---|---|
| *B60W 60/00* | (2020.01) |
| *B60W 50/02* | (2012.01) |
| *B60W 50/029* | (2012.01) |
| *E05B 77/46* | (2014.01) |
| *G06V 20/59* | (2022.01) |

(52) U.S. Cl.
CPC .... *B60W 60/0015* (2020.02); *B60W 50/0205* (2013.01); *B60W 50/029* (2013.01); *B60W 60/0025* (2020.02); *E05B 77/465* (2013.01); *G06V 20/593* (2022.01); *B60W 2050/0292* (2013.01)

(58) Field of Classification Search
CPC ......... B60W 60/0015; B60W 50/0205; B60W 50/029; B60W 60/0025; B60W 2050/0292; E05B 77/465
See application file for complete search history.

(56) References Cited

U.S. PATENT DOCUMENTS

| | | | |
|---|---|---|---|
| 7,103,460 B1 * | 9/2006 | Breed | G07C 5/008 706/15 |
| 2007/0216517 A1 * | 9/2007 | Kurpinski | B60R 25/2036 340/8.1 |
| 2015/0226146 A1 * | 8/2015 | Elwart | F02N 11/0818 701/112 |
| 2017/0213165 A1 * | 7/2017 | Stauffer | G06Q 10/02 |
| 2018/0281816 A1 * | 10/2018 | Otsuka | G06F 11/0781 |
| 2019/0079513 A1 * | 3/2019 | Greenfield | B60W 60/00186 |
| 2019/0103019 A1 * | 4/2019 | Fowe | G08G 1/015 |
| 2019/0184998 A1 * | 6/2019 | Zheng | B60W 30/182 |

(Continued)

FOREIGN PATENT DOCUMENTS

| | | | |
|---|---|---|---|
| DE | 10247148 A1 * | 4/2004 | ............. B60R 25/24 |
| JP | 2006291631 A * | 10/2006 | |

(Continued)

*Primary Examiner* — Jelani A Smith
*Assistant Examiner* — Nada Mahyoob Alqaderi
(74) *Attorney, Agent, or Firm* — Dinsmore & Shohl LLP

(57) ABSTRACT

A control device executes the following processes: a first process of detecting that autonomous traveling control is not able to be continued and executing stop control of a vehicle; a second process of determining whether a person is present in the vehicle; and a third process of unlocking a door lock of the vehicle when at least one person is present in the vehicle after the vehicle is stopped by the first process.

5 Claims, 4 Drawing Sheets

(56) References Cited

U.S. PATENT DOCUMENTS

| | | | | |
|---|---|---|---|---|
| 2019/0197325 | A1* | 6/2019 | Reiley | G08B 13/19602 |
| 2019/0248378 | A1* | 8/2019 | Nix | G05D 1/0077 |
| 2019/0299925 | A1* | 10/2019 | Shi | B60N 2/273 |
| 2019/0385443 | A1* | 12/2019 | Hur | B60J 5/047 |
| 2020/0001892 | A1* | 1/2020 | Aoi | E05F 15/73 |
| 2020/0010061 | A1* | 1/2020 | Tiwari | B60W 10/192 |
| 2020/0050199 | A1* | 2/2020 | Park | G06Q 10/06315 |
| 2020/0193368 | A1* | 6/2020 | Bhatia | H04W 4/40 |
| 2020/0193734 | A1 | 6/2020 | Kamata et al. | |
| 2020/0307556 | A1* | 10/2020 | Noguchi | G05D 1/0223 |
| 2020/0384948 | A1* | 12/2020 | Toyooka | H04Q 9/00 |
| 2022/0135080 | A1* | 5/2022 | Hamada | B60W 30/06 |
| | | | | 701/23 |
| 2022/0163344 | A1* | 5/2022 | Pandit | G01C 21/3438 |

FOREIGN PATENT DOCUMENTS

| | | | | |
|---|---|---|---|---|
| JP | 2016-200986 A | 12/2016 | | |
| JP | 2018-169689 A | 11/2018 | | |
| JP | 2020-097850 A | 6/2020 | | |
| JP | 7109533 B2 * | 7/2022 | | B60W 10/06 |
| WO | 2015/166721 A1 | 11/2015 | | |
| WO | WO-2020164814 A1 * | 8/2020 | | |

* cited by examiner

CONTROL DEVICE AND CONTROL METHOD FOR VEHICLE

CROSS-REFERENCE TO RELATED APPLICATION

This application claims priority to Japanese Patent Application No. 2020-206202 filed on Dec. 11, 2020, incorporated herein by reference in its entirety.

BACKGROUND

1. Technical Field

The present disclosure relates to a control device provided for a vehicle that executes autonomous traveling control, and a control method for the vehicle.

2. Description of Related Art

In a vehicle that executes autonomous traveling control, it is necessary to safely stop the vehicle when the autonomous traveling control cannot be continued while the autonomous traveling control is being executed. Conventionally, various techniques have been proposed for stopping the vehicle when such autonomous traveling control cannot be continued.

Japanese Unexamined Patent Application Publication No. 2016-200986 (JP 2016-200986A) discloses, in a vehicle that executes the autonomous traveling control, a control device for the vehicle that suppresses difficulty in movement of the vehicle even after the autonomous traveling control cannot be continued while the autonomous traveling control is being executed and the vehicle is stopped.

When it is determined that the autonomous traveling control cannot be continued, the control device causes the vehicle to travel in a limp home mode to a safe evacuation site and then stops the vehicle. Then, when the vehicle is stopped, the control is terminated without operating a parking device. This suppresses difficulty in movement of the vehicle after the vehicle is stopped.

SUMMARY

It is conceivable that an operation of the vehicle that executes the autonomous traveling control is for the purpose of people flow to transport people and the logistics purpose to transport goods. Especially when the level of autonomous driving rises, it is assumed that an in-vehicle operator is no longer required (autonomous driving of level 4 or higher). When the operation purpose of the vehicle is the logistics purpose, it is assumed that no person is present in the vehicle.

When the door lock of the vehicle remains locked after the vehicle is stopped in the case where the autonomous traveling control cannot be continued, the escape route of the person in the vehicle is obstructed. However, on the other hand, when the door lock of the vehicle is to be unlocked, the goods may be stolen in the case where the operation purpose of the vehicle is for the logistics purpose and no person is present in the vehicle. For example, when the control device for the vehicle is maliciously attacked, the goods mounted on the vehicle can be easily reached after the vehicle is stopped.

The present disclosure has been made in view of the above issue, and the present disclosure provides, in a vehicle that executes autonomous traveling control, a control device and a control method for a vehicle. The control device and the control method are capable of appropriately protecting a person or goods in the vehicle after the autonomous traveling control cannot be continued and thus the vehicle is stopped.

A control device according to an aspect of the present disclosure is provided in a vehicle that executes autonomous traveling control. The control device executes the following processes: a first process of detecting that autonomous traveling control is not able to be continued and executing stop control of a vehicle; a second process of determining whether a person is present in the vehicle; and a third process of unlocking a door lock of the vehicle when at least one person is present in the vehicle after the vehicle is stopped by the first process.

In the third process, when no person is present in the vehicle, the control device may lock the door lock.

Alternatively, in the second process, the control device may further determine whether there are goods in the vehicle, and in the third process, when no person is present in the vehicle and there are goods in the vehicle, the control device may locks the door lock. At this time, when an operation purpose of the vehicle is a logistics purpose, the control device regards that there are goods in the vehicle in the second process.

A control method according to an aspect of the present disclosure relates to a vehicle that executes autonomous traveling control. This control method includes of the following steps: a first step of detecting that the autonomous traveling control is not able to be continued and stopping the vehicle; a second step of determining whether a person is present in the vehicle; and a third step of unlocking a door lock of the vehicle when the determination is made in the second step that at least one person is present in the vehicle.

In the control method, in the third step, when the determination is made in the second step that no person is present in the vehicle, the door lock may be locked.

Alternatively, in the second step, whether there are goods in the vehicle may further be determined, and in the third step, when the determination is made in the second step that no person is present in the vehicle and there are goods in the vehicle, the door lock may be locked.

According to the control device and the control method for the vehicle according to the present disclosure, after the detection is made that the autonomous traveling control cannot be continued and the vehicle is stopped, whether to unlock or lock the door lock of the vehicle is determined corresponding to the situation of the person in the vehicle. With the process above, it is possible to appropriately protect the person or goods in the vehicle after the vehicle is stopped.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Configuration

A control device according to the present embodiment is provided in a vehicle that executes autonomous traveling control. The vehicle may be operated for the purpose of people flow to transport people or for the logistics purpose to transport goods. When the purpose is the purpose of people flow, the vehicle is, for example, a vehicle that moves by autonomous traveling with a plurality of occupants on board. When the purpose is the logistics purpose, the vehicle is, for example, a vehicle in which a plurality of goods is loaded and that autonomously travels to a specific point to transport the goods. In addition, the vehicle is provided with one or more doors for a person to get in or for loading the goods, and each door has a door lock function. The door opens by unlocking the door lock, and when the door lock is locked, the door cannot be opened.

Note that, the vehicle provided with the control device according to the present embodiment may include a vehicle used for both the purpose of people flow and the logistics purpose. For example, the vehicle is a vehicle or the like that is used for the purpose of people flow in a certain time slot and for the purpose of logistics in another certain time slot.

Figure 1:
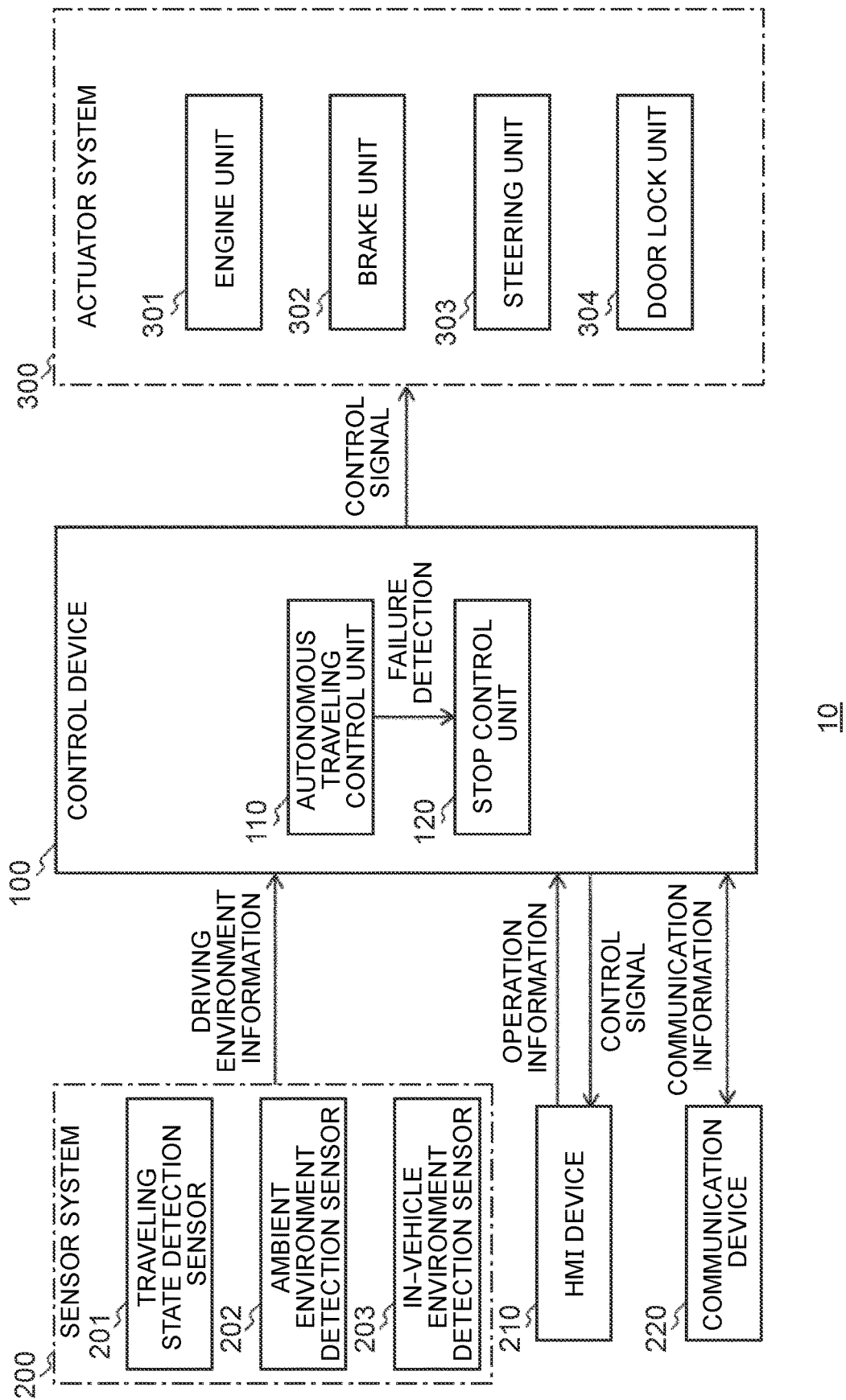
FIG. 1 is a block diagram showing a functional configuration of a vehicle system provided with a control device according to the present embodiment.

FIG. 1 is a block diagram showing a functional configuration of the vehicle system 10 provided with a control device 100 according to the present embodiment. The vehicle system 10 includes the control device 100, a sensor system 200, a human machine interface (HMI) device 210, a communication device 220, and an actuator system 300. The control device 100 is electrically or wirelessly connected to the sensor system 200, the HMI device 210, the communication device 220, and the actuator system 300, and is configured to be able to exchange information with each other.

The sensor system 200 is a sensor system that detects and outputs information related to a driving environment of the vehicle (driving environment information). The sensor system 200 includes a traveling state detection sensor 201, an ambient environment detection sensor 202, and an in-vehicle environment detection sensor 203.

The traveling state detection sensor 201 detects and outputs a traveling state (vehicle speed, acceleration, yaw rate, etc.) of the vehicle. The traveling state detection sensor 201 is, for example, a wheel speed sensor, an accelerometer, or a gyro sensor.

The ambient environment detection sensor 202 detects and outputs information on the environment around the vehicle (lanes, obstacles, preceding vehicles, etc.). The ambient environment detection sensor 202 is, for example, a millimeter wave radar, a camera, or light detection and ranging (LiDAR).

The in-vehicle environment detection sensor 203 detects and outputs information on the in-vehicle environment (a person and goods in the vehicle, etc.). The in-vehicle environment detection sensor 203 is, for example, a camera that captures images of the inside of the vehicle, or a radar that detects an object in the vehicle. The information output by the in-vehicle environment detection sensor 203 includes at least information with which whether a person is present in the vehicle can be determined in the process executed by the control device 100 to be described later. For example, when the control device 100 can determine whether a person is present in the vehicle based on the image by image analysis, the in-vehicle environment detection sensor 203 outputs image data indicating the environment in the vehicle. Alternatively, the in-vehicle environment detection sensor 203 may directly output information on whether a person is present in the vehicle.

The sensor system 200 may include a sensor that detects other operating environment information.

The HMI device 210 provides the control device 100 with various information (operation information) by being operated by a person, and also transmits, to the person, information related to a process executed by the control device 100 based on a control signal provided by the control device 100 (hereinafter also referred to as "process information"). The HMI device 210 is, for example, a switch, an indicator, a speaker, a touch panel, a car navigation device, or the like, or a combination or a set thereof. The operation information provides, for example, on and off setting of the control function, operation sensitivity setting of the control function, unlocking or locking of the door lock, setting of the destination in autonomous traveling control, and the like. The process information indicates, for example, an operating state of the control function, a setting state related to the control function, and the like.

The HMI device 210 may be provided in the vehicle or may be a device outside the vehicle. For example, the HMI device 210 may be a terminal held by an operator located outside the vehicle and may be a device that mutually exchanges information with the control device 100 from the outside of the vehicle. In this case, the HMI device 210 mutually exchanges information with the control device 100 via the communication device 220 to be described later.

The communication device 220 transmits and receives various types of information (communication information) through communication with a device outside the vehicle. The communication device 220 is, for example, a device for performing vehicle-to-vehicle communication or road-to-vehicle communication, a device that provides a global positioning system (GPS) function, a device that transmits and receives the communication information to and from a server connected to a communication network and configured on the network, and the like. The communication information acquired by the control device 100 via the communication device 220 is, for example, map information, road traffic information, and vehicle position information on a map by the GPS function. The communication related to the communication device 220 may be performed in any form. For example, the communication may be performed by transmitting and receiving radio waves, or may be performed by transmitting and receiving information via a network.

The control device 100 executes various processes related to vehicle control based on information (driving environment information, operation information, and communication information) acquired from the sensor system 200, the HMI device 210, and the communication device 220, and generates a control signal. The control device 100 then outputs the control signal to the actuator system 300 to be described later. Further, the control device 100 outputs the control signal that provides the processing information to the HMI device 210.

The control device 100 is typically an electronic control unit (ECU) including a processor and a memory. The memory includes a random access memory (RAM) that temporarily stores data and a read-only memory (ROM) that stores a program that can be executed by the processor and various types of data related to the program. The information received by the control device 100 is stored in the memory. The processor reads the program from the memory and executes a process in accordance with the program based on various types of data read from the memory.

The control device 100 includes at least an autonomous traveling control unit 110 and a stop control unit 120. The autonomous traveling control unit 110 executes a process related to the autonomous traveling control of the vehicle and generates a control signal related to the autonomous travel control. Typically, the autonomous traveling control unit 110 sets a traveling plan to the destination (a route on the map to the destination, arrival time, etc.), and generates control signals related to acceleration, braking, and steering such that the vehicle travels along the traveling route generated based on the traveling plan and the driving environment information.

When the stop control unit 120 detects that the autonomous traveling control unit 110 cannot continue the autonomous traveling control (failure detection), the stop control unit 120 executes a process related to stop control of the vehicle and generates a control signal related to the stop control. In particular, the control signal generated by the stop control unit 120 includes a signal for executing control of the door lock of the vehicle. The details of a failure detection method and the process executed by the stop control unit 120 will be described later.

The autonomous traveling control unit 110 and the stop control unit 120 may each be realized as a processing portion in the program, or may each be realized by a separate processor. Alternatively, the autonomous traveling control unit 110 and the stop control unit 120 may be configured by separate ECUs. In this case, the control device 100 may be composed of a plurality of the ECUs. At this time, the ECUs are each configured to be able to mutually exchange information with each other to the extent that information necessary for executing the process can be acquired.

The processes executed by the control device 100 are not limited to the processes executed by the autonomous traveling control unit 110 and the stop control unit 120, and the control device 100 may execute processes related to other controls. For example, the control device 100 may execute a process of unlocking or locking the door lock of the vehicle based on the operation information acquired from the HMI device 210.

The actuator system 300 is a system of actuators that operate in accordance with a control signal provided by the control device 100. The actuator system 300 includes an engine unit 301, a brake unit 302, a steering unit 303, and a door lock unit 304. However, other actuators may be included.

The engine unit 301 indicates an actuator that drives an engine (including, for example, an electric motor, an internal combustion engine, or a hybrid thereof) provided in the vehicle. A control related to acceleration is realized by providing a control signal to the engine unit 301. The brake unit 302 indicates an actuator that drives a brake provided in the vehicle. A control related to braking is realized by providing a control signal to the brake unit 302. The steering unit 303 indicates an actuator that drives a steering of the vehicle. A control related to steering is realized by providing a control signal to the steering unit 303. The door lock unit 304 indicates an actuator that unlocks or locks the door lock of the vehicle. A control related to the door lock of the vehicle is realized by providing a control signal to the door lock unit 304.

2. Function 2-1. Failure Detection

The stop control unit 120 detects that the autonomous traveling control unit 110 cannot continue the autonomous traveling control (failure detection). The failure detection may be performed in any form. Hereinafter, an example of the form of failure detection will be described.

An example of the form of failure detection is a method of performing the failure detection by interrupting a signal constantly provided by the autonomous traveling control unit 110. Typically, the autonomous traveling control unit 110 and the stop control unit 120 mutually exchange signals with each other at predetermined intervals. Therefore, when the signal transmitted from the autonomous traveling control unit 110 to the stop control unit 120 is interrupted for a certain period of time, it can be determined that the autonomous traveling control unit 110 is not operating normally.

Another example of the form of failure detection is the case where the autonomous traveling control unit 110 has a self-diagnostics function. The autonomous traveling control unit 110 notifies the stop control unit 120 of the failure when the autonomous traveling control cannot be continued, which is determined by the self-diagnostics. The stop control unit 120 then detects the failure by acquiring the notification. The self-diagnostics of the autonomous traveling control unit 110 is, for example, a watchdog timer, abnormality detection of the acquired driving environment information, or the like.

Another example of the form of failure detection is a method of performing the failure detection in which the stop control unit 120 transmits a signal to the autonomous traveling control unit 110 to determine whether the autonomous traveling control unit 110 is operating normally, and the autonomous traveling control unit 110 makes a response to the transmitted signal. For example, the method is a method performed based on whether an acknowledgment (ACK) in response to the transmitted signal can be received, or through detection of an error (checksum, cyclic redundancy check (CRC), etc.) in a response signal to the transmitted signal.

Another example of the form of failure detection is a method of performing the failure detection based on the control state of the autonomous traveling control unit 110. In this case, the stop control unit 120 acquires information on the control state of the autonomous traveling control unit 110. The information on the control state is, for example, a traveling plan, a traveling route, a control signal, etc. related to the autonomous traveling control. The stop control unit 120 detects a failure when the control state of the autonomous traveling control unit 110 is abnormal. For example, the traveling route related to the autonomous traveling control deviates from the range in which safe traveling is possible. The range is calculated by the stop control unit 120.

2-2. Stop Control Unit

Figure 2:
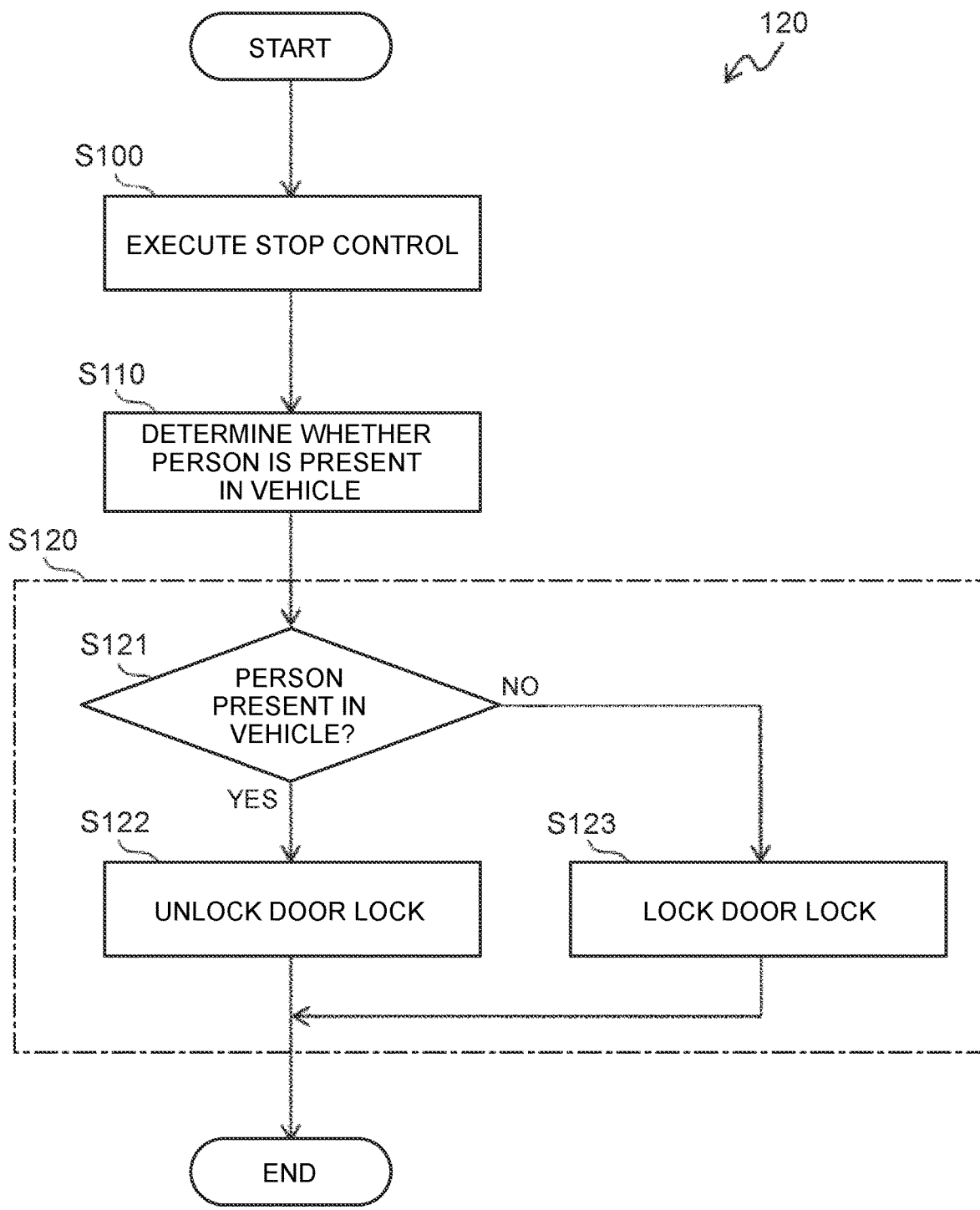
FIG. 2 is a flowchart showing a process executed by a stop control unit.

When the stop control unit 120 detects a failure, the stop control unit 120 executes the process related to the stop control of the vehicle and generates a control signal related to the stop control. FIG. 2 is a flowchart showing the process executed by the stop control unit 120. The process shown in FIG. 2 is executed when the stop control unit 120 detects a failure.

In step S100 (first process), the stop control unit 120 executes the stop control for stopping the vehicle and generates a control signal for stopping the vehicle. Here, the method of executing the stop control of the vehicle is not particularly limited. For example, the vehicle may be pulled over to the shoulder to stop, or the vehicle may simply be braked to stop. After the vehicle is stopped, the process proceeds to step S110.

In step S110 (second process), the stop control unit 120 determines whether a person is present in the vehicle based on the acquired driving environment information. For example, when the image data indicating the environment inside the vehicle is acquired as the driving environment information, the stop control unit 120 determines whether a person is present in the vehicle by image analysis. Alternatively, as the driving environment information, information on whether a person is present in the vehicle may be acquired and the determination may be made in accordance with the information. After step S110, the process proceeds to step S120.

In step S120 (third process), the stop control unit 120 generates a control signal related to the door lock corresponding to the situation of the person in the vehicle. When at least one person is present in the vehicle (step S121; Yes), the door lock is unlocked (step S122). When no person is present in the vehicle (step S121; No), the door lock is locked (step S123). Here, in step S122 or step S123, the door lock to be unlocked or locked is the door lock of all of one or more doors provided in the vehicle.

After step S120, the process ends. Note that, after the process is completed, the operator of the vehicle may be able to unlock or lock the door lock of the vehicle via the HMI device 210. With the process above, the operator can determine whether to unlock or lock the door lock after the process is executed.

3. Effect

As described above, the control device 100 according to the present embodiment detects that the autonomous traveling control cannot be continued and stops the vehicle. Then, when at least one person is present in the vehicle, the control device 100 secures the escape route by unlocking the door lock of the vehicle, and when no person is present in the vehicle, the control device 100 locks the door lock of the vehicle. With the process above, it is possible to appropriately protect a person or goods in the vehicle after the vehicle is stopped.

4. Modification

The control device 100 according to the present embodiment may adopt a modified mode as follows. In the following, the matters described in the above contents will be omitted as appropriate.

4-1. First Modification

Figure 3:
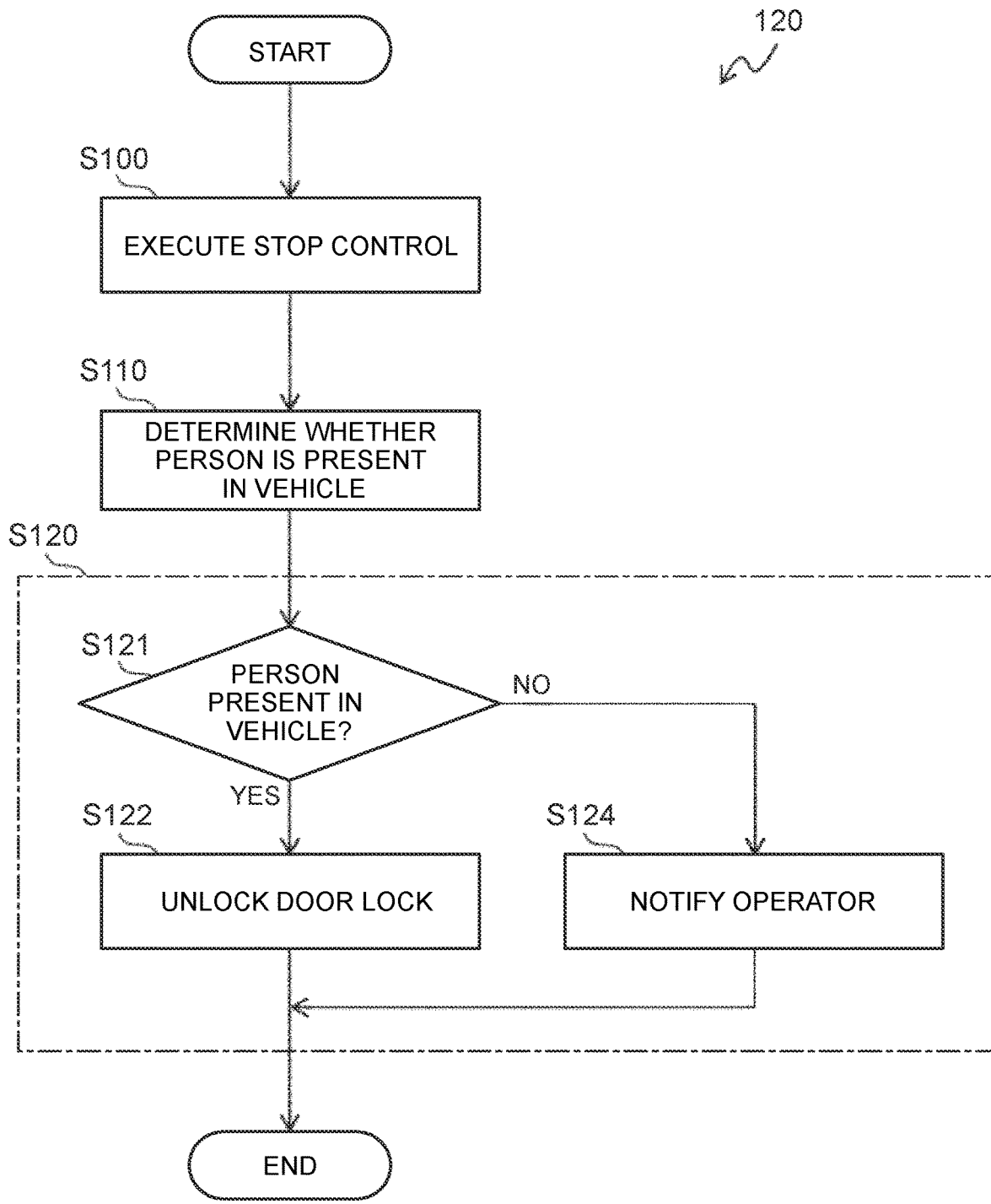
FIG. 3 is a flowchart showing a process executed by a stop control unit according to a first modification of the present embodiment.

When no person is present in the vehicle, the stop control unit 120 may entrust the operator of the vehicle to determine whether to unlock or lock the door lock after the vehicle is stopped. FIG. 3 is a flowchart showing a process executed by the stop control unit 120 according to a first modification of the present embodiment. When no person is present in the vehicle (step S121; No), the stop control unit 120 according to the first modification does not lock the door lock and notifies the operator of the vehicle (step S124). The notification conveys, for example, that the vehicle cannot continue the autonomous traveling control and is thus stopped, and that the operator is entrusted for making a decision of whether to unlock or lock the door lock of the vehicle.

The operator of the vehicle receives the notification via the HMI device 210 and determines whether to unlock or lock the door lock of the vehicle. The operator of the vehicle then unlocks or locks the door lock of the vehicle via the HMI device 210.

Adoption of the modified mode as described above makes it possible to immediately secure the escape route when at least one person is present in the vehicle, and to cause the operator of the vehicle to unlock or lock the door lock corresponding to the situation when no person is present in the vehicle.

4-2. Second Modification

Figure 4:
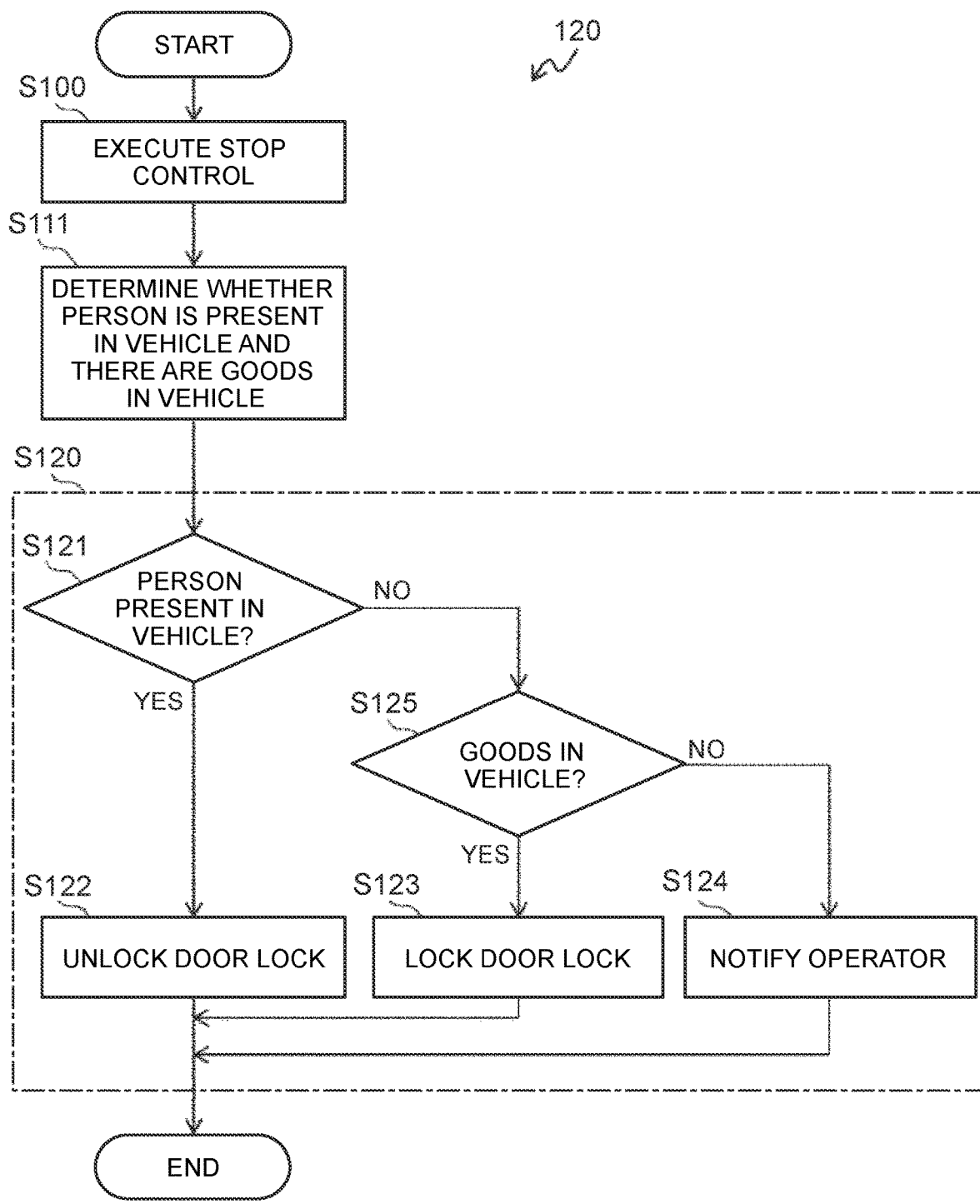
FIG. 4 is a flowchart showing a process executed by a stop control unit according to a second modification of the present embodiment.

The stop control unit 120 may lock the door lock when no person is present in the vehicle and there are goods in the vehicle after the vehicle is stopped. FIG. 4 is a flowchart showing a process executed by the stop control unit 120 according to a second modification of the present embodiment. In step S111 (second process), the stop control unit 120 according to the second modification determines whether a person is present in the vehicle and whether there are goods in the vehicle based on the acquired driving environment information. The determination above may be made in a manner such that the stop control unit 120 analyzes the driving environment information, or may be directly provided with information on whether a person is present in the vehicle and there are goods in the vehicle as the driving environment information.

Then, when no person is present in the vehicle (step S121; No), the stop control unit 120 unlocks or locks the door lock of the vehicle in accordance with the determination of whether there are goods in the vehicle (step S125). When there are goods in the vehicle (step S125; Yes), the vehicle door lock is locked (step S123). When there are no goods in the vehicle (step S125; No), the operator is notified (step S124).

Adoption of the modified mode as described above makes it possible to lock the door lock and appropriately protect the goods when no person is present in the vehicle and there are goods in the vehicle. On the other hand, when no person is present in the vehicle and there are no goods in the vehicle, there is no object to be protected immediately, and the door lock can be unlocked or locked at the discretion of the operator.

Here, in step S111, the determination of whether there are goods in the vehicle may be performed based on the operation purpose of the vehicle. That is, when the operation purpose of the vehicle is the logistics purpose, it may be considered that there are goods. This makes it possible to appropriately make a determination in accordance with the operation purpose.

Further, the determination of whether the operation purpose of the vehicle is the purpose of people flow or the logistics purpose may be made based on the setting by the operator of the vehicle. In this case, the operator of the vehicle sets whether the operation purpose of the vehicle is the purpose of people flow or the logistics purpose via the HMI device 210.

What is claimed is:

1. A control device provided in a vehicle that executes autonomous traveling control, the control device comprising:
   a first processor that is configured to execute the autonomous traveling control of the vehicle, and set a traveling plan to a destination; and
   a second processor that is configured to execute a first process, a second process, and a third process, the first process of detecting that the autonomous traveling control is not able to be continued to the destination due to a failure of the autonomous traveling control and executing stop control of the vehicle, the stop control of the vehicle corresponding to the vehicle being pulled over to a shoulder to stop, the failure of the autonomous traveling control being detected based on error detection in a response signal by the first processor to a transmitted signal by the second processor, the error comprising a checksum or a cyclic redundancy check;

a second process of determining whether a person is present in the vehicle and whether there are goods in the vehicle; and a third process of unlocking a door lock of the vehicle when at least one person is present in the vehicle after the vehicle is stopped by the first process, wherein the vehicle is configured for a first purpose including people flow for a first time slot and a second purpose including logistics to transport goods for a second time slot, the determination of whether there are goods in the vehicle is based on an operation purpose corresponding to the first purpose or the second purpose of the vehicle by a setting via a human machine interface, and an operator of the vehicle is entrusted to determine whether to unlock or lock the door lock of the vehicle after the vehicle is stopped when no person is determined to be present in the vehicle, and notifying the operator of the vehicle that the vehicle cannot continue the autonomous traveling control and that the operator is entrusted for making the decision to unlock or lock the door lock of the vehicle.

2. The control device according to claim 1, wherein in the second process, when the operation purpose of the vehicle is the second purpose to transport goods, the second processor regards that there are goods in the vehicle.

3. A control method for a vehicle that executes autonomous traveling control, the control method comprising:

executing, by a first processor, the autonomous traveling control of the vehicle, and setting a traveling plan to a destination;

a first step of detecting, by a second processor, that the autonomous traveling control is not able to be continued to the destination due to a failure of the autonomous traveling control and stopping the vehicle, the stopping of the vehicle corresponding to the vehicle being pulled over to a shoulder to stop, the failure of the autonomous traveling control being detected based on error detection in a response signal by the first processor to a transmitted signal by the second processor, the error comprising a checksum or a cyclic redundancy check;

a second step of determining, by the second processor, whether a person is present in the vehicle and whether there are goods in the vehicle; and a third step of unlocking, by the second processor, a door lock of the vehicle when the determination is made in the second step that at least one person is present in the vehicle, wherein the vehicle is configured for a first purpose including people flow for a first time slot and a second purpose including logistics to transport goods for a second time slot, the determination of whether there are goods in the vehicle is based on an operation purpose corresponding to the first purpose or the second purpose of the vehicle by a setting via a human machine interface, and entrusting an operator of the vehicle to determine whether to unlock or lock the door lock of the vehicle after the vehicle is stopped when no person is determined to be present in the vehicle, and notifying the operator of the vehicle that the vehicle cannot continue the autonomous traveling control and that the operator is entrusted for making the decision to unlock or lock the door lock of the vehicle.

4. The control device according to claim 1, wherein the failure of the autonomous traveling control is detected by interrupting the response signal for a certain period of time.

5. The control method according to claim 3, wherein the failure of the autonomous traveling control is detected by interrupting the response signal for a certain period of time.

* * * * *